W. B. KILLOUGH.
Wrench.
No. 217,117. Patented July 1, 1879.
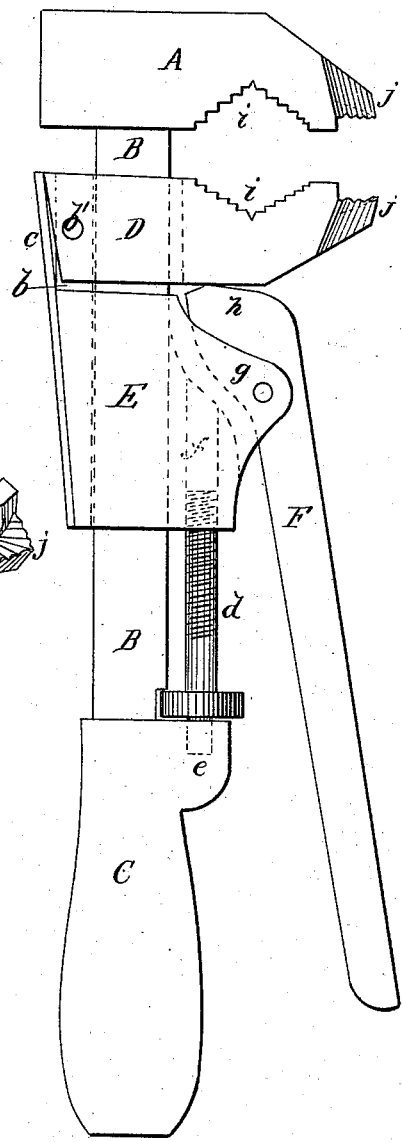
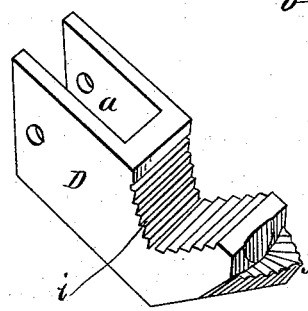
WITNESSES:
Henry N. Miller
C. Sedgwick
INVENTOR:
W. B. Killough
BY
ATTORNEYS.

UNITED STATES PATENT OFFICE.

WILLIAM B. KILLOUGH, OF LARISSA, TEXAS.

IMPROVEMENT IN WRENCHES.

Specification forming part of Letters Patent No. 217,117, dated July 1, 1879; application filed April 8, 1879.

*To all whom it may concern:*

Be it known that I, WILLIAM B. KILLOUGH, of Larissa, in the county of Cherokee and State of Texas, have invented a new and Improved Wrench, of which the following is a specification.

The object of this invention is to furnish an adjustable wrench for holding and turning bolts, pipes, taps, &c.

It consists of one fixed and one movable jaw, placed on a shank and pivoted to a sleeve controlled by a screw, and carrying a lever with a cam-face working under the pivoted jaw. The jaws have serrated V-shaped recesses to grasp the larger objects, while projecting from the front thereof are lips with serrated concave recesses for taking hold of the heads of bolts. The several parts are arranged and operated in a manner that will be fully described farther on.

In the accompanying drawings, Figure 1 is a side elevation of my improvement, and Fig. 2 is a perspective view of the movable jaw.

Similar letters of reference indicate corresponding parts.

Referring to the drawings, A represents the fixed jaw of the wrench attached to the upper end of shank B, at the opposite end of which is a handle, C. D is the movable jaw, having in its rear end a slot, $a$, in which is entered the shank. E is the sleeve or movable socket-piece placed on the shank B, having on its upper end, behind the shank, a projection, $b$, which enters the slot $a$. This projection and the jaw are connected together by a pivot, $b'$, in such a way as to allow a slight movement to the jaw on the pivot.

A flat spring, $c$, fixed to the back edge of the sleeve, reaches up and bears against the end of the jaw, as shown clearly in Fig. 1.

A screw, $d$, socketed at its lower end in a projection, $e$, of the handle, engages the thread of a socket, $f$, (indicated by dotted lines,) in the sleeve. By means of this screw the sleeve and jaw D are moved up and down on the shank.

In ears (one of which is indicated by $g$ in the drawings) projecting from the front of the sleeve E is fulcrumed a lever, F, with a cam-face, $h$, immediately under the jaw D, while its power end extends down convenient to the handle C.

In opposite faces of the jaws are serrated V-shaped recesses $i\ i$, and at their ends are V-shaped lips $j\ j$, with serrated concave recesses.

The large recesses $i$ are employed for pipes, tubing, taps, and the large bolts, while the lips $j$ are used to grasp bolt-heads when unscrewing the nuts; and the operation of the device is as follows: When the larger objects are to be grasped by the wrench, the jaws are opened sufficiently wide to admit them into the recesses $i$; then the jaw D is screwed up until it clasps the object between it and jaw A; then the lever is turned down, forcing the jaw D tightly against the object, whereby it is closely held and can be turned in screwing it up or held perfectly fast when a nut or tap is being unscrewed.

When a bolt is to be taken out of a hole, and becomes so loose that the nut cannot be unscrewed, the lips $j$ are placed over the head until it rests in the concave recesses, the jaws are then brought together as before, and it will be found that it can be held against whatever power that may be exerted in turning the nut.

Having thus described my invention, I claim as new and desire to secure by Letters Patent—

The combination, in a wrench, of the vibratory jaw D, having slot $a$, the movable sleeve E, having projection $b$, the lever F, pivoted between ears of said sleeve, and the spring $c$, with the shank B, as shown and described.

WILLIAM B. KILLOUGH.

Witnesses:
E. G. McGLATHY,
J. G. BEATY.